June 16, 1925.

T. MIDGLEY 1,542,800

TIRE MOLD

Original Filed March 5, 1923

INVENTOR.
Thomas Midgley
BY
Edward C Taylor
ATTORNEY.

Patented June 16, 1925.

1,542,800

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

TIRE MOLD.

Application filed March 5, 1923, Serial No. 622,764. Renewed April 27, 1925.

*To all whom it may concern:*

Be it known that I, THOMAS MIDGLEY, a citizen of the United States of America, residing at Hampden, in the county of Hampden and State of Massachusetts, have invented certain new and useful Improvements in Tire Molds, of which the following is a specification.

This invention relates to improvements in molds adapted for vulcanizing rubber articles, such, for example, as tire casings, and is particularly directed to the improvement of such molds in economy of operation, low cost, lightness, and ease in stripping the tire from the mold. It finds particular utility with molds intended to be used under internal fluid pressure.

The invention will now be described in connection with the accompanying drawings, in which—

Figure 1:
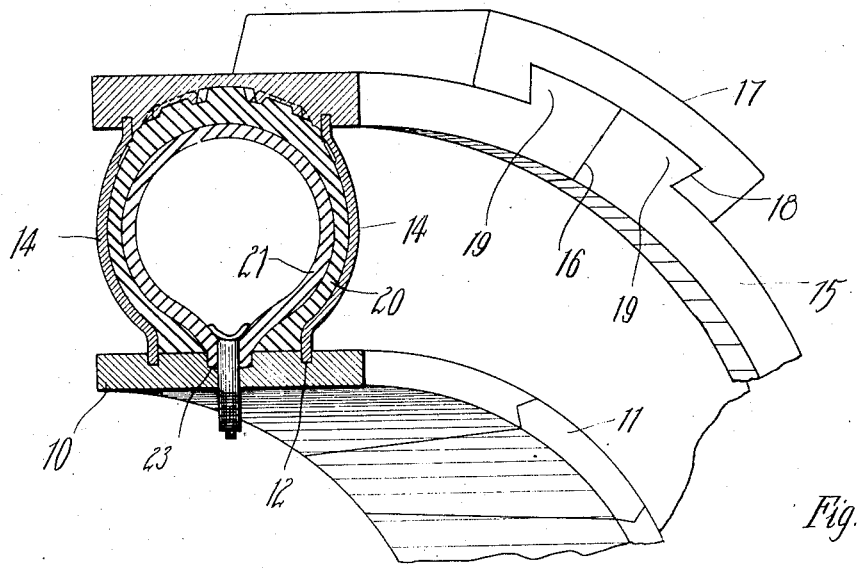
Figure 2:
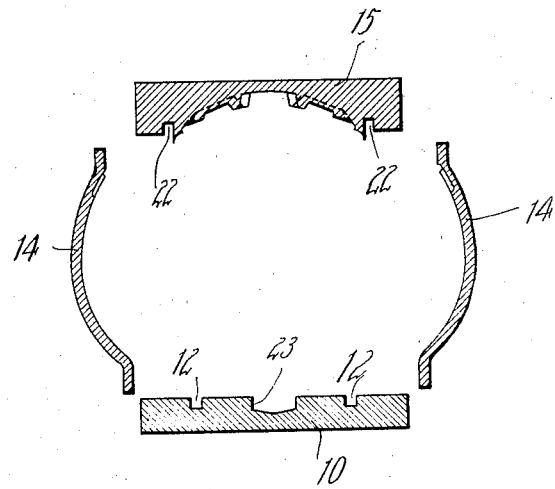

Fig. 1 is a sectional view showing a portion of the complete circumference of the mold; and Fig. 2 is a sectional view showing the parts separated.

In copending applications Serial Nos. 622,264 and 622,491 filed March 2, 1923, and March 3, 1923, respectively, I have illustrated molds of the general type of that here shown. It is the object of the present invention to improve those molds in certain particulars which will appear, and to adapt them especially for cases where, by the nature of the tread pattern in depth, angularity, or some other feature, it would be difficult to remove a tire from the mold if a unit tread ring were used.

The mold in the illustrated embodiment is formed with a transversely split annular band 10, forming a base ring supporting the inside of the tire and other mold parts. The transverse gap in the ring is closed, and the ring held in expanded condition, by a wedge 11 suitably dovetailed or beveled to form with the ring a tight and stable joint. Grooves 12 are provided around the outer periphery of this ring, and also through the outer surface of the wedge if the latter is of the full thickness of the ring, into which the inner edges of mold side plates 14 are adapted to fit. These plates are suitably formed to the configuration of the sides of the tire and are preferably made of sheet metal stampings. The tread portion of the mold is formed of a ring 15, transversely split at 16 and formed on its inner periphery to the reverse of the tread pattern desired. If the ring is made of sufficiently thin material so that by its own elasticity it may be expanded away from the tire, one such split is sufficient, but greater ease in stripping the mold from deep and angular tread patterns may be obtained by forming the tread ring in two more sections completely severable from each other. The split in the ring in the first instance, and each juncture between the sections in the second instance, is closed and the entire tread ring held firmly together as a complete annulus by a bridge piece 17 having a dovetailed wedge slot 18 in its inner side. This slot is adapted to fit over correspondingly shaped projections 19 on abutting ends of the ring sections, so that by driving the wedge sideways the ring sections will be drawn together and held firmly in assembled relation. The abutting ends of the read ring sections may be formed, if desired, with interlocking portions adapted to keep the sections in alignment. Grooves 22 in the tread ring receive the outer edges of the side plates, so that all mold parts are held in assembled relation by wedge 11 and bridge piece 17. The tire 20 is shown assembled in the mold together with an expansible annular bag 21 having a base seating in a depression 23 in the base ring.

The form of the side plates has been shown as similar to that of my copending application Serial No. 622,491 filed March 3, 1923, but may be made similar to the disclosure in my application Serial No. 622,264 filed March 3, 1923, if desired, or may be otherwise varied, together with other features of design, within the scope of the appended claims.

Having thus described my invention, I claim:

1. A mold adapted for vulcanizing tire casings, comprising a transversely split base ring, a pair of side plates adapted to interfit with the base ring, means for holding the base ring in expanded position, a transversely split tread ring adapted to interfit with the side plates, and means for holding the tread ring together to form a complete annulus and to retain the other parts in assembled relation.

2. A mold adapted for vulcanizing tire casings, comprising a transversely split base ring, means for holding the base ring in expanded position, a transversely split tread ring, means for holding the tread ring together to form a complete annulus, a pair of side plates adapted to form together with the base and tread rings an enclosed molding space for the reception of a tire, and means for holding the tread and base rings in assembled relation with the side plates.

3. A mold adapted for vulcanizing tire casings, a transversely split base ring, means for holding the base ring in expanded position, a transversely split tread ring having its abutting ends shaped with projecting wedge portions, a bridge piece shaped to interfit with said wedge portions and adapted to draw the abutting ends of the tread ring together, side plates adapted to form together with the base and tread rings an enclosed molding space for the reception of a tire, and means for holding the side plates in assembled relation with the base and tread rings.

THOMAS MIDGLEY.